United States Patent [19]

Schelp

[11] 4,081,958
[45] Apr. 4, 1978

[54] LOW NITRIC OXIDE EMISSION COMBUSTION SYSTEM FOR GAS TURBINES

[75] Inventor: Helmut R. Schelp, Pacific Palisades, Calif.

[73] Assignee: The Garrett Corporation, Los Angeles, Calif.

[21] Appl. No.: 649,935

[22] Filed: Jan. 19, 1976

Related U.S. Application Data

[63] Continuation-in-part of Ser. No. 411,868, Nov. 1, 1973, abandoned.

[51] Int. Cl.² .............................................. F02C 7/22
[52] U.S. Cl. .............................. 60/39.51 R; 60/39.67; 60/39.71; 60/39.69 A; 431/7; 431/170; 431/328
[58] Field of Search ............. 60/39.51 R, 39.71, 39.65, 60/39.67, 39.23, 39.74 R, DIG. 11, 39.82 C, 39.69 A; 431/7, 170, 326–329

[56] References Cited

U.S. PATENT DOCUMENTS

| | | | |
|---|---|---|---|
| 2,622,395 | 12/1952 | Bowden | 60/39.51 R |
| 2,922,279 | 1/1960 | Roberson | 60/39.71 |
| 3,705,492 | 12/1972 | Vickers | 60/39.51 R |
| 3,742,702 | 7/1973 | Quinn | 60/39.51 R |
| 3,797,231 | 3/1974 | McLean | 60/39.51 H |
| 3,826,078 | 7/1974 | Quigg | 60/39.51 R |
| 3,842,597 | 10/1974 | Ehrich | 60/DIG. 11 |
| 3,851,466 | 12/1974 | Verdouw | 60/39.65 |
| 3,937,007 | 2/1976 | Kappler | 60/39.71 |

FOREIGN PATENT DOCUMENTS

| | | | |
|---|---|---|---|
| 1,932,881 | 8/1970 | Germany | 60/39.71 |

Primary Examiner—Robert E. Garrett
Attorney, Agent, or Firm—Jack D. Puffer; Stuart O. Lowry; Albert J. Miller

[57] ABSTRACT

Primary air to the fuel-air mixing chamber of a gas turbine engine is cooled to reduce generation of nitrous oxides. A porous disc separates the fuel-air mixture chamber from the combustion chamber and serves to uniformly mix the fuel and air to reduce the reaction temperature. A catalyst is sprayed on the disc surface in the combustion chamber to speed combustion. A heater embedded in the disc heats the disc and prevents excessive generation of nitrous oxides during the engine start-up. A metering valve can be used to regulate the temperature of the primary air by supplying heated secondary air to the primary air.

17 Claims, 7 Drawing Figures

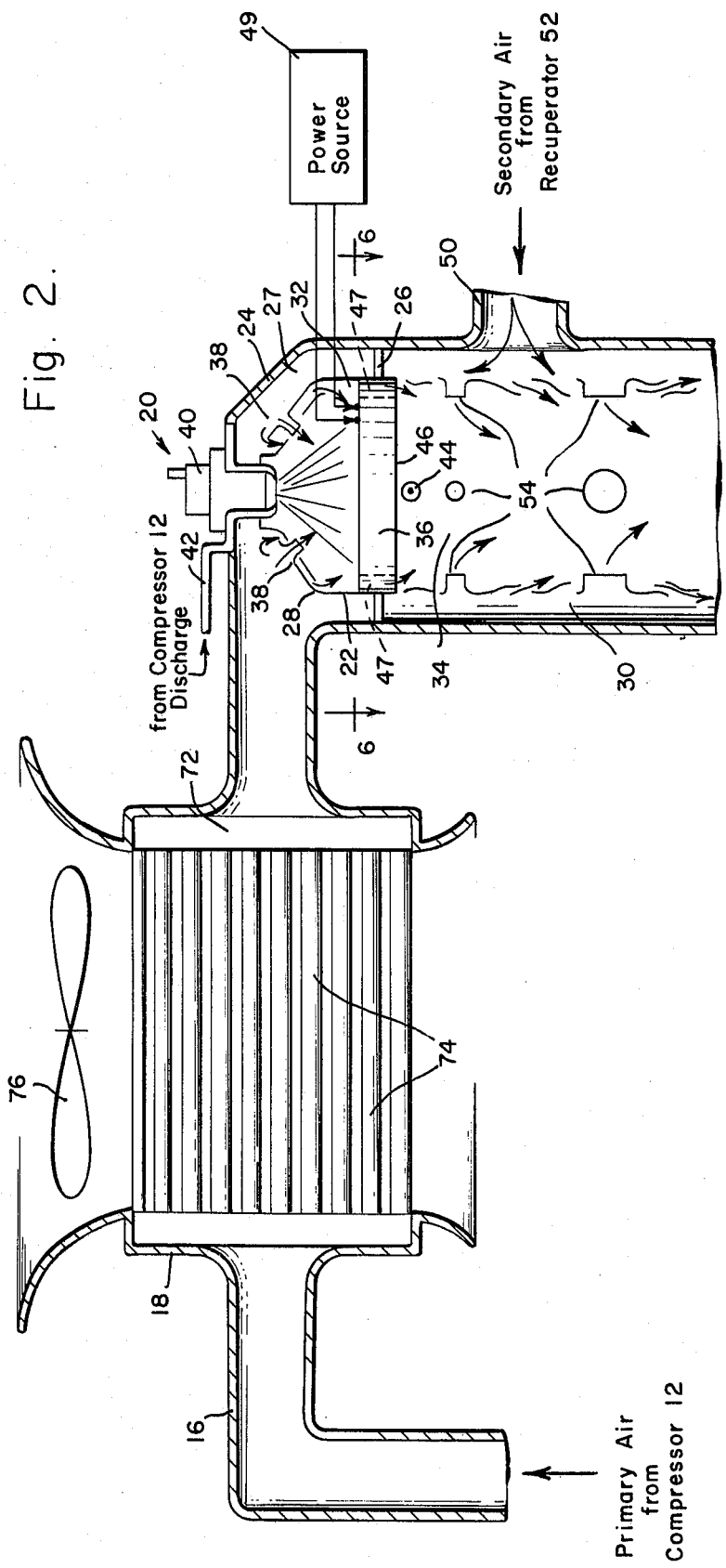

LOW NITRIC OXIDE EMISSION COMBUSTION SYSTEM FOR GAS TURBINES

BACKGROUND OF THE INVENTION

This application is a continuation in part of U.S. Patent Application S/N 411,868 filed Nov. 1, 1973, now abandoned.

Combustion systems for gas turbines are presently available which minimize the emission of carbon monoxide and unburned hydrocarbons. However, attempts to provide for low nitrous oxide emission in gas turbine engines have proven difficult to achieve mainly because of the high reaction temperatures utilized in the engines. It has been determined that for fuel-lean and chemically correct mixtures of hydrogen and air, nitrous oxides are formed in post flame combustion gases and its reaction rate is greatly dependent upon the reaction temperature and the time that the mixture is held at this temperature. That is, the higher the reaction temperature, the faster the reaction time and, accordingly, the formation of more undesirable nitrous oxide. For this reason it has proven difficult to provide gas turbine engines with the lowest possible nitrous oxide emission in order to meet present or future exhaust emission standards.

Examples of prior art gas turbine engine combustion systems can be found in the following U.S. Pat. Nos.: 2,458,066 to Farkas et al; 3,541,790 to Kellett; and 3,584,459 to Amann. Of particular interest is U.S. Pat. No. 2,622,395 to Bowden which also describes combustion apparatus; and U.S. Pat. No. 3,656,298 to Wade and U.S. Pat. No. 3,705,492 to Vickers, both of which describe combustion apparatus minimizing the formation of oxides of nitrogen.

SUMMARY OF THE INVENTION

The invention disclosed herein overcomes the disadvantages of the prior art devices described above by providing a combustor having two separate chambers. In the first chamber, fuel is vaporized and mixed with primary air from the compressor which has been pre-cooled before being directed to the combustor. The air-fuel mixture from the mixing chamber is forced by pressure differential through a porous ceramic plate into the primary burning zone in the second chamber of the combustor. The porous plate acts as a mixing device for mixing the air-fuel mixture uniformly and, in the lower combustion chamber, acts as a flame holder to maintain the primary burning zone up near the hot lower surface of the disc to speed reaction. Secondary air which has been passed through a recuperator for additional heating is introduced into the lower combustion chamber. The mixture in the primary zone is a fuel rich mixture and, being fully mixed with primary air, burns rapidly in the primary zone providing short flame dwell times at high combustion temperatures resulting in lower nitrus oxide generation. This mixture then flows into the secondary zone where diluent air is added to create a fuel lean mixture providing for low hydrocarbon content in the exhaust emissions.

BRIEF DESCRIPTION OF THE DRAWINGS

FIG. 2 is a vertical cross sectional view of exemplary apparatus embodying the present invention;

DESCRIPTION OF THE PREFERRED EMBODIMENTS

Figure 1:
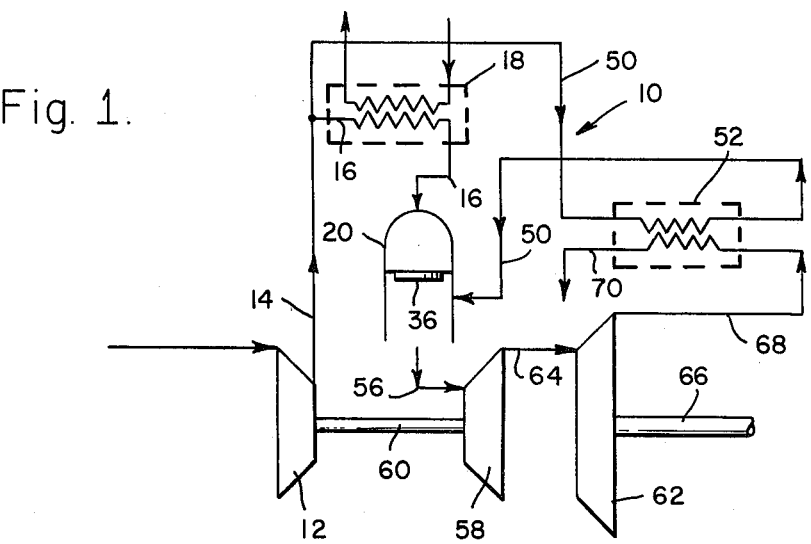
FIG. 1 is a diagrammatic showing of the combustion system for a gas turbine engine embodying the present invention.

The drawings, and in particular FIG. 1, illustrate a gas turbine engine 10 including an air compressor 12 which discharges compressed air through a conduit 14. A branch conduit 16 conveys a portion of the compressed air, which is primary air, through an intercooler 18 to the engine combustor 20. A flame tube 22, best illustrated in FIG. 2, is positioned within a casing 24, as by means of an annular ring member 26. The ring 26 is suitably fastened as by welding to the casing 24 and tube 22 to form an upper chamber 27 surrounding the dome 28 of the flame tube and an annular lower chamber 30 surrounding the lower portion of the tube. The flame tube 22 is divided into an upper pre-mix or primary chamber 32 and a lower combustion chamber 34 by a porous ceramic disc 36 suitably positioned within the tube 22 as by bonding. The disc 36 can be of circular shape. The primary air from the branch conduit 16 is conveyed into the upper chamber 26 and then into the pre-mix chamber 32 of the tube 22 by openings 38 wherein it is mixed with fuel injected into the pre-mix chamber 32 by any conventional means as by an atomizer nozzle 40 and an additional air assist apparatus 42 adapted to be connected to the compressor 12, as shown in FIG. 2.

The mixed air-fuel impinges on the upper surface of the porous ceramic disc 36, which can be fashioned from high temperature ceramics such as silicon nitrite, silicon carbide, or the like. The disc 36 is permeable to a mixture of fuel and air. The fuel droplets, mixed with the primary air, are vaporized within the pores of the heated ceramic disc 36 and enter the lower chamber 34 as a uniform fuel rich mixture of air and fuel vapor for combustion as by the ignitor 44 near the lower surface of the ceramic disc 36. The radiation of the flame provides the heat to maintain the disc 36 at an elevated temperature to insure fuel vaporization. The ceramic disc 36 within the flame tube not only provides uniformity to the air-fuel vapor mixture to thus reduce the high local reaction temperature, but also acts as a flame holder to provide stable combustion for the lean primary fuel-air mixture from chamber 32 to lower the flame temperature in chamber 34.

Figure 3:
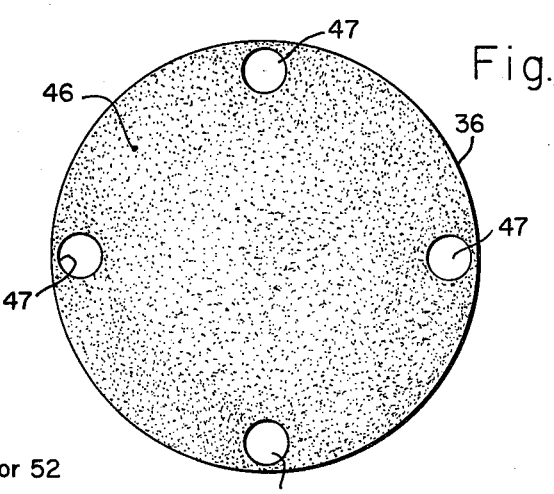
FIG. 3 is a bottom view of the disc of FIG. 2.

The lower surface of ceramic disc 36 is further provided with a coating 46 of material such as platinum, or the like, best shown in FIG. 3. The platinum can be lightly sprayed on the surface so as not to destroy the porosity of the disc. The platinum acts as a catalyst to provide a speeding up of surface combustion to shorten the fuel residence time in the primary chamber 32 which minimizes the time exposure of the post flame gases at elevated temperatures resulting in minimal formation nitrous oxides.

Figure 6:
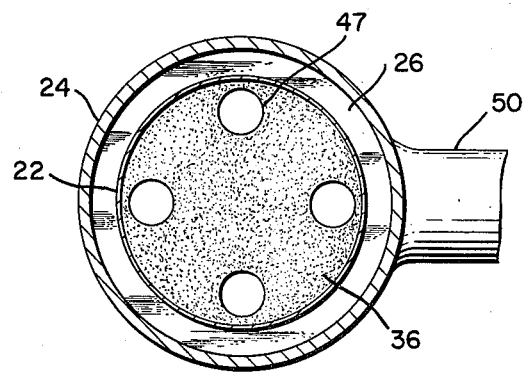
FIG. 6 is a sectional view of the combustor taken along line 6—6 of FIG. 2.
Figure 7:
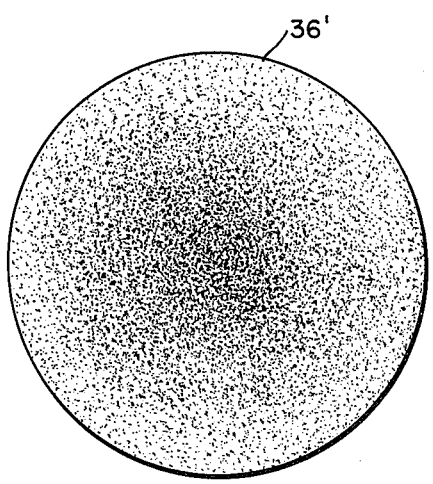
FIG. 7 shows a second embodiment of the porous disc.

As is illustrated in FIGS. 3 and 6, the ceramic disc may be provided with a plurality of holes near its outer edge which allow a portion of the air-fuel mixture from chamber 32 to flow through these openings without passing through the disc pores. This vapor is forced into the lower chamber and aids in recirculation of the primary burning mixture in chamber 34 to maintain it against the lower surface of the disc 36. As shown in FIG. 7, the holes 47 in the disc may be eliminated and the disc 36' formed with a varying density across its diameter. As illustrated in FIG. 6, the disc has a high density in the center and with the porosity becoming more open near the edge. Thus a greater amount of the fuel-air mixture from the upper premix chamber will flow through the edge portion than flows through the center, again resulting in substantial recirculation of the primary burning mixture in the lower chamber to maintain the mixture near the lower surface of the disc.

Figure 4:
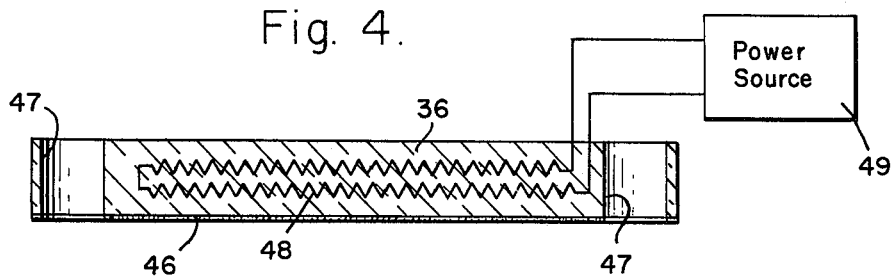
FIG. 4 is a cross sectional view of the disc.

In order to minimize excessive formation of nitric oxide during start-up of the gas turbine 10, as shown in FIG. 4, the ceramic disc 36 has embedded therein electric heating wires 48 connected to a suitable electrical power source 49 for preheating the disc 36 prior to the admission of fuel to the combustion chamber 34. Once combustion has been initiated, the disc will be maintained above the vaporization temperature by the heat of combustion.

Referring again to FIG. 1, another branch conduit 50 conveys the rest of the compressed air, which is secondary air, through a heat exchanger apparatus 52 to the lower chamber 30 and then through openings 54 in the flame liner 22 to the lower part of the combustion chamber 34. The combustion products from the combustion apparatus 20 are discharged from the chamber 34 through conduit 56 into a first or high pressure turbine 58. The turbine 58 drives the compressor 12 through the shaft 60.

The exhaust from the turbine 58 is supplied to a second or low pressure turbine 62 through the combustion products conduit 64. The turbine 62 drives a shaft 66 to which may be connected any desired load (not illustrated). The low pressure exhaust from the turbine 62 is conveyed through conduit 68 to the heat exchanger 52 and then to exhaust to atmosphere through conduit 70. The heat exchanger 52 can be of any suitable type, as for example a recuperator.

Conveying primary air directly from the compressor 12 through the conduit 16 to the primary chamber 32 without adding heat from the heat exchanger 52 helps to maintain the lowest attainable reaction temperature in the combustion chamber 34. It is appreciated that this somewhat increases the specific fuel consumption, which is undesirable, but at the same time results in increased effectiveness of the heat exchanger 52, because only the air flow to the air side of the heat exchanger 52 is decreased by the amount of primary air used in the pre-mix chamber 32, while the gas flow to the gas side of the heat exchanger 52 is not decreased. This results in a higher air temperature of the secondary air which is introduced into the combustion chamber 34 downstream of the reaction zone for quenching or cooling the combustion products.

Provision of the intercooler 18 between the compressor 12 and the pre-mix chamber 32 inlet serves as yet another means for controlling the primary air temperature to further minimize or lower the formation of nitric oxide emission. To this end, the intercooler 18, as shown in FIG. 2, is provided with an open chamber 72 having positioned therein a plurality of tubes 74 through which the compressed air is forced first to the chamber 26 and then to the pre-mix chamber 32. Cooling of the tubes 74 and compressed air therein is accomplished by means of a fan 76 capable of rotation by a variable speed motor (not shown) and passing ambient air over the tubes. The heat removed from the compressed air can be utilized as clean heat for personnel in the vehicle (not shown).

The operation of the device may be further explained by analyzing the pressure distribution through the system. As is noted above, the combuster casing is divided into two distinct separate chambers by the annular wall member 26 as shown in FIGS. 1 and 6. This is necessary in order to ensure that the fuel-air mixture from the pre-mix chamber passes through the plate rather than around it. In addition, the use of the recuperator for heating the secondary combustion air is highly desirable to increase fuel efficiency. There is however a second advantage in including this recuperator in the system. If it is assumed that the compressor of a gas turbine will raise the pressure of the inlet air from atmospheric pressure by a ratio of 6:1, the output from the compressor in conduit 16 will be at approximately 88.2 lbs per square inch. A typical heat exchanger pressure loss would be in the neighborhood of 4% which would amount to approximately 3.5 p.s.i., and the pressure drop across the flame liner surface is typically 3% which would be an additional 2.65 p.s.i. The air, as it enters the diluent or combustion chamber 34 of the liner after the drop of the heat exchanger and liner will be at a pressure of approximately 82 p.s.i. The primary air from the compressor will enter the upper chamber 32 of the casing at the compressor discharge pressure of 88.2 p.s.i. Allowing for the 3% drop across the flame liner the pressure in the air-fuel mixture chamber will be at approximately 86.6 p.s.i. Thus by separating both the casing and the liner into separate chambers as defined in the claims of the application there is provided across the porous disc 36 a pressure differential of about 4.6 p.s.i. This pressure differential is required to force all of the fuel-air mixture through the disc so that it will be mixed and vaporized before entering the combustion zone in the lower portion of the liner. Thus it can be seen that the inclusion of the recuperator and the wall creating two separate chambers aid in achieving a proper pressure profile in the system.

Figure 5:
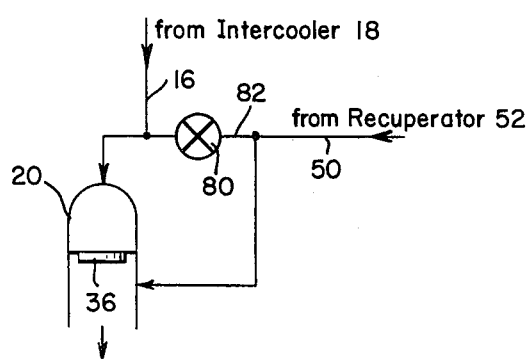
FIG. 5 is a partial showing of the combustion system of FIG. 1 including a modification.

As mentioned above, in the system of FIG. 1 all the primary air bypasses the recuperator 52, which results in a penalty in fuel consumption. Also in many instances, the exhaust emission requirements can be satisfied if only a portion of the primary air bypasses the recuperator 52. Accordingly, in some applications a regulating valve 80 is installed in a line 82 which connects the primary air line 16 with the secondary air line 50, as shown in FIG. 5. The valve 80 meters heated secondary air to the primary air thus modulating or regulating the temperature of the primary air. In its simplest form, the valve 80 can be a fixed orifice valve.

While a specific embodiment of the invention has been illustrated and described, it is to be understood that it is provided by way of example only and that the invention is not to be construed as being limited thereto, but only by the proper scope of the following claims.

What I claim is:

1. A combustion system for a gas turbine engine having an air compressor comprising:
    a casing;
    a flame liner positioned within said casing, said liner having a side wall and an end wall, each having wall openings;
    wall means extending between said casing and said liner, said wall means defining an upper chamber between said end wall and said casing and defining a separate lower chamber between said side wall and said casing;

means permeable to a fuel-air mixture positioned within said liner, defining a fuel-air mixture chamber between said permeable means and said end wall and defining a combustion chamber in the interior of said side wall below said permeable means, said fuel-air mixture chamber and said combustion chamber being surrounded by said upper and lower chambers, respectively, said permeable means having radially outwardly increasing porosity such that a mixture of air and fuel passes more readily through peripheral portions than through central portions whereby turbulence is generated adjacent said permeable means in said combustion chamber;

first conduit means for receiving compressed air from the compressor and for conveying one portion of compressed air from the compressor to said upper chamber, said casing, said liner and said wall means cooperating to direct all said one portion of air through said permeable means;

second conduit means for receiving compressed air from the compressor and for conveying another portion of compressed air from the compressor to said lower chamber; and means for supplying fuel directly to the fuel-air mixture chamber.

2. The combustion system of claim 1 wherein said permeable means comprises:
a porous member.

3. The combustion system of claim 1 further comprising:
a coating of catalytic material on the surface of said permeable means within said combustion chamber for speeding up the combustion of the fuel-air mixture.

4. The combustion system of claim 3 wherein said catalytic material comprises:
platinum.

5. The combustion system of claim 1 further comprising:
heater means embedded in said permeable means and adapted for connection to a source of energy for heating said permeable means.

6. The combustion system of claim 1 further comprising:
heat exchanger means connected in said first conduit means for cooling compressed air conveyed to said upper chamber.

7. The combustion apparatus of claim 1 wherein said permeable means comprises:
a porous ceramic disc.

8. The combustion system according to claim 1 and further comprising means for heating the air in said second conduit.

9. The combustion system of claim 8 and further comprising third conduit means connecting said first and said second conduit means; and valve means for admitting a portion of the heated air from said second conduit means into said first conduit means.

10. A combustion system for a gas turbine engine having an air compressor comprising:
a generally cylindrical casing;
a flame liner positioned within said casing and having a closed end portion, an open end portion, and wall openings therethrough;
impermeable annular wall means attached between said casing and said liner, said wall means defining an upper chamber between said closed end portion and said casing and a lower chamber between said open end portion and said casing;
a disc fashioned from porous material concentrically positioned within said liner and defining a fuel air mixture chamber between said closed end portion and said disc and defining a combustion chamber between said disc and said open end portion, said fuel-air mixture chamber being surrounded by and communicating with said upper chamber, said combustion chamber being surrounded by and communicating with said lower chamber, and said disc being operable to introduce a combustible fuel-air mixture to said combustion chamber for conflagration therein, said disc having radially outwardly increasing porosity such that the fuel-air mixture passes more readily through peripheral portions than through central portions whereby turbulence is generated adjacent said disc in said combustion chamber;
a coating of platinum on said disc within said combustion chamber;
heater wires within said disc adapted for connection to a source of electrical energy for heating said disc;
a first conduit adapted for connection to the compressor and connected to said casing for conveying compressed air from the compressor to said upper chamber;
a first heat exchanger connected in said first conduit for cooling the compressed air conveyed to said upper chamber;
a second conduit adapted for connection to the compressor and connected to said casing for conveying compressed air from the compressor to said lower chamber;
a second heat exchanger connected in said second conduit for heating compressed air in said second conduit; and
means supplying fuel directly to the fuel-air mixture chamber for intermixing with compressed air from the upper chamber.

11. Combustion apparatus for a gas turbine engine comprising:
a casing means for enclosing gas combustion, said casing means having upper and lower air inlets;
a flame liner means positioned within said casing;
wall means for forming separate upper and lower chambers surrounding said liner means and communicating with said upper and lower inlets, respectively, said liner means having wall openings connecting said chambers and the interior of said liner means; and
a circular disc means of porous material positioned within said liner means, forming a fuel-air mixture chamber and a combustion chamber surrounded by said upper and lower chambers, respectively, said disc means having orifices adjacent the edge connecting said fuel-air mixture chamber and said combustion chamber, and being operable to vaporize liquid fuel passing therethrough.

12. The combustion apparatus of claim 11 wherein said porous material comprises:
silicon nitrite.

13. The combustion apparatus of claim 11 wherein said porous material comprises:
silicon carbide.

14. A combustion system for a gas turbine engine having a compressor and a fuel supply comprising:

casing means having a closed upper portion receiving primary air from a compressor and fuel from a fuel supply, having a lower portion receiving secondary air from the compressor, and operable to enclose gaseous combustion of air and fuel;

liner means positioned in the casing means, having a plurality of lateral openings therethrough and operable to shield the casing means from burning air and fuel;

imperforate wall means, extending between the casing means and the liner means, cooperating with the casing means and the liner means to define a secondary air chamber, and operable to support the liner means relative to the casing means; and heated porous means carried by the liner means, cooperating with the casing means and the wall means to define a first chamber that receives the primary air and the fuel, cooperating with the liner means to define a flame combustion chamber communicating with the secondary air chamber, and operable to vaporize liquid fuel passing therethrough and to function as a flame holder for the combustion chamber, said porous means having orifices adjacent the outermost edge connecting the first chamber and said combustion chamber.

15. A combustion system for a gas turbine engine having a compressor and a fuel supply comprising:

casing means having a closed upper portion receiving primary air from a compressor and fuel from a fuel supply, having a lower portion receiving secondary air from the compressor, and operable to enclose gaseous combustion of air and fuel;

liner means positioned in the casing means, having a plurality of lateral openings therethrough and operable to shield the casing means from burning and fuel;

imperforate wall means, extending between the casing means and the liner means, cooperating with the casing means and the liner means to define a secondary air chamber, and operable to support the liner means relative to the casing means; and heated porous means carried by the liner means, cooperating with the casing means and the wall means to define a first chamber that receives the primary air and the fuel, cooperating with the liner means to define a flame combustion chamber communicating with the secondary air chamber, and operable to vaporize liquid fuel passing therethrough and to function as a flame holder for the combustion chamber said porous means having radially outwardly increasing porosity such that a mixture of the primary air and fuel passes more readily through peripheral portions than through central portions whereby turbulence is generated adjacent the porous means in the combustion chamber.

16. In a gas turbine engine combustor having a casing and a flame liner, the improvement comprising:

porous means positioned in the flame liner, separating the flame liner into a mixing chamber and a combustion chamber, having a radially outwardly increasing porosity such that a fuel air mixture passes more readily through peripheral portions than central portions, and operable as a flame holder for the combustion chamber.

17. In a gas turbine engine combustor having a casing, a flame liner, a primary burner airflow, a diluent burner airflow, and a fuel flow, the improvement comprising:

wall means supporting the flame liner within the casing and isolating the primary burner airflow from the diluent burner airflow; and porous means positioned in the flame liner, separating the flame liner into a mixing chamber which receives the primary burner airflow and the fuel flow and a combustion chamber which receives the primary burner airflow, the fuel flow and the diluent burner airflow, and operable to vaporize liquid fuel passing therethrough into the combustion chamber from the mixing chamber, said porous means having orifices adjacent the outermost edge connecting the mixing chamber and the combustion chamber.

* * * * *